United States Patent
Koganehira et al.

(10) Patent No.: US 8,021,472 B2
(45) Date of Patent: Sep. 20, 2011

(54) INK COMPOSITION FOR INK JET RECORDING

(75) Inventors: Shuichi Koganehira, Matsumoto (JP); Hironori Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 266 days.

(21) Appl. No.: 12/339,520

(22) Filed: Dec. 19, 2008

(65) Prior Publication Data

US 2009/0176071 A1 Jul. 9, 2009

(30) Foreign Application Priority Data

Dec. 21, 2007 (JP) ................. 2007-330850
Feb. 8, 2008 (JP) ................. 2008-029532
May 13, 2008 (JP) ................. 2008-125937

(51) Int. Cl.
C09D 11/02 (2006.01)

(52) U.S. Cl. ............... 106/31.58; 106/31.59; 106/31.86; 106/31.89

(58) Field of Classification Search .......... 106/31.58, 106/31.59, 31.86, 31.89; 347/100
See application file for complete search history.

(56) References Cited

U.S. PATENT DOCUMENTS

| | | | |
|---|---|---|---|
| 5,141,556 A * | 8/1992 | Matrick ............ | 106/31.58 |
| 7,517,399 B2 * | 4/2009 | Sato et al. ............ | 106/31.58 |
| 7,537,652 B2 * | 5/2009 | Koganehira et al. ........ | 106/31.58 |
| 7,553,360 B2 * | 6/2009 | Koganehira et al. ........ | 106/31.58 |
| 7,569,104 B2 * | 8/2009 | Yatake ............ | 106/31.58 |
| 7,604,692 B2 * | 10/2009 | Koganehira et al. ........ | 106/31.58 |
| 7,686,876 B2 * | 3/2010 | Koganehira et al. ........ | 106/31.58 |
| 2005/0235870 A1 * | 10/2005 | Ishihara ............ | 106/31.86 |
| 2007/0247504 A1 * | 10/2007 | Koganehira et al. .......... | 347/100 |
| 2008/0213548 A1 * | 9/2008 | Koganehira et al. ........ | 428/195.1 |
| 2009/0297716 A1 * | 12/2009 | Koganehira et al. .......... | 427/288 |
| 2009/0308279 A1 * | 12/2009 | Koganehira et al. ........ | 106/31.13 |
| 2010/0010121 A1 * | 1/2010 | Koganehira et al. ............ | 524/90 |
| 2010/0086685 A1 * | 4/2010 | Mizutani et al. .............. | 427/256 |

FOREIGN PATENT DOCUMENTS

| | | |
|---|---|---|
| JP | 2003-213179 | 7/2003 |
| JP | 2005-194500 | 7/2005 |

* cited by examiner

*Primary Examiner* — Helene Klemanski
(74) *Attorney, Agent, or Firm* — Ladas & Parry LLP

(57) ABSTRACT

An object of the present invention is to provide an ink composition with which images with high quality without white streaks or roughness can be provided even when the images are printed at a low resolution on coated printing paper such as art paper. The ink composition for ink jet recording at least includes a colorant, water, an alcohol solvent, and a surfactant, wherein the alcohol solvent contains a slightly water-soluble alkanediol, a water-soluble 1,2-alkanediol, and a dialkylene glycol.

24 Claims, No Drawings

INK COMPOSITION FOR INK JET RECORDING

CROSS-REFERENCES TO RELATED APPLICATIONS

The entire disclosure of Japanese Patent Application No. 2007-330850, filed on Dec. 21, 2007, No. 2008-029532, filed on Feb. 8, 2008, No. 2008-125937, filed on May 13, 2008, are expressly incorporated by reference herein.

FIELD OF THE INVENTION

The present invention relates to an ink composition for ink jet recording, the ink composition providing a high quality recorded product without printing irregularities for various recording media, in particular, recording media having low water absorbency such as synthetic paper, coated printing paper, resin films, or the like.

BACKGROUND OF THE INVENTION

An ink jet recording method is a printing method in which ink droplets are ejected so as to adhere to recording media such as paper to conduct printing. According to innovative progress in ink jet recording techniques in recent years, the ink jet recording method is now also used in the field of high definition printing which was previously conducted only by silver salt photography or offset printing. With this trend, inks for ink jet recording have been developed that can provide images having high gloss almost equal to that of silver salt photographs by using, in ink jet recording, recording media having high gloss (special paper) almost equal to that of photographic paper, art paper, and the like that are used in the fields of silver salt photography and offset printing. Inks for ink jet recording have also been developed that can provide image quality almost equal to that of silver salt photographs even when plain paper is used.

With the widespread use of techniques for forming images from digital data in recent years, there is an increasing demand for digital color proofing (DTP) particularly in the field of printing. The ink jet recording method is also beginning to be used in DTP. DTP requires color reproducibility and stable reproducibility of printed products. For this reason, when a proof is produced by the ink jet recording method, special paper for ink jet recording is generally used.

However, in color proof applications, there is a demand for ink jet recording with coated printing paper rather than with special paper. When a final proof can be produced by conducting ink jet recording directly with coated printing paper without using special paper, it is thought that costs incurred for proofing can be considerably reduced. Synthetic paper produced by mixing a polyethylene resin or a polyester resin with inorganic filler or the like and forming films with the resultant mixture has been attracting attention as a material having excellent recyclability and environmental friendliness in recent years.

Coated printing paper is coated paper having a coated layer thereon for receiving oil based ink. The coated layer has a characteristic of poor capability of absorbing ink. For this reason, when commonly-used water-based pigmented ink is used for ink jet recording, the ink exhibits low permeability with respect to the recording medium (coated printing paper) and hence bleeding or agglomeration irregularities can be caused in the resultant images.

To deal with the problem described above, for example, Japanese Unexamined Patent Application Publication No. 2005-194500 (Patent Document 1) discloses a pigment-based ink that causes less bleeding and provides excellent gloss when used with special paper, the pigment-based ink containing a polysiloxane compound as a surfactant and an alkanediol such as 1,2-hexanediol as a solubilizing agent. Japanese Unexamined Patent Application Publication No. 2003-213179 (Patent Document 2) proposes that addition of a water-soluble organic solvent such as glycerin or 1,3-butanediol to ink enables control of the permeability of the ink into a recording medium, thereby providing images with high quality.

[Patent Document 1] Japanese Unexamined Patent Application Publication No. 2005-194500

[Patent Document 2] Japanese Unexamined Patent Application Publication No. 2003-213179

SUMMARY OF THE INVENTION

The inventors of the present invention proposed, in an earlier patent application (Japanese Patent Application No. 2007-241158), that images with high quality without white streaks or roughness can be provided by adding a surfactant such as polysiloxane and two types of alkanediols and an alkanetriol to ink even when the images are printed with the ink at a low resolution on recording media having low capability of absorbing liquid such as coated printing paper.

This time, the inventors have achieved a finding that, by using a dialkylene glycol instead of the alkanetriol, images with high quality without white streaks or roughness can be provided not only on coated printing paper but also on recording media having no capability of absorbing liquid such as resin films. The present invention is based on this finding.

Accordingly, an object of the present invention is to provide an ink composition with which images with high quality without white streaks or roughness can be provided even when the images are printed at a low resolution on recording media having low capability of absorbing liquid such as coated printing paper or resin films.

An ink composition for ink jet recording according to the present invention at least includes a colorant, water, an alcohol solvent, and a surfactant, wherein the alcohol solvent contains a slightly water-soluble alkanediol, a water-soluble 1,2-alkanediol, and a dialkylene glycol.

According to the present invention, images with high quality without white streaks or roughness can be provided even when the images are printed at a low resolution on recording media having low capability of absorbing liquid such as coated printing paper or resin films.

DETAILED DESCRIPTION OF THE PRESENT INVENTION

An ink composition for ink jet recording according to the present invention at least includes a colorant, water, an alcohol solvent, and a surfactant, wherein the alcohol solvent contains a slightly water-soluble alkanediol, a water-soluble 1,2-alkanediol, and a dialkylene glycol. Hereinafter, each component is described.

<Definition>

In the present specification, alkanediols and dialkylene glycols may be linear or branched.

"Water-soluble" refers to a solubility in water (the amount of solute based on 100 g of water) of 10.0 g or more. "Slightly water-soluble" refers to a solubility in water (the amount of solute based on 100 g of water) of less than 1.0 g.

<Alcohol Solvent>

An alcohol solvent used for an ink composition for ink jet recording according to the present invention at least contains three types of organic solvents: a slightly water-soluble alkanediol, a water-soluble 1,2-alkanediol, and a dialkylene glycol. The presence of these three types of alcohol solvents as essential components suppresses agglomeration of ink on coated printing paper, in particular, on paper having a relatively high capability of absorbing ink such as art paper, paper for POD applications (for example, Ricoh business coat gloss 100 manufactured by Ricoh Company, Ltd., and the like), and special paper for laser printers (for example, LPCCTA4 manufactured by SEIKO EPSON CORPORATION, and the like) and images with high quality without white streaks or roughness can be provided even when the images are printed at a low resolution. Furthermore, images with high quality without white streaks or roughness can also be provided even when the images are printed on recording media having almost no capability of absorbing ink such as resin films.

In the present specification, "agglomeration" refers to, when a solid image is printed (for example, when a square 6 inches per side is printed with a single color (this does not refer to the number of ink colors)), local density irregularities that are generated and have similar colors. "Agglomeration" does not refer to the state in which there remain portions that are not covered with ink on the surfaces of recording media. "White streaks" refer to, when a solid image is printed (for example, when a square of 6 inches per side is printed with a single color), a phenomenon in which there are no local density irregularities having similar colors and there remain streak-shaped portions that are not covered with ink on the surfaces of recording media in the driving direction of a recording head. "Roughness" or "filling failure" refers to, when a solid image is printed in the same manner described above, a phenomenon in which there are no local density irregularities having similar colors, there remain portions that are not covered with ink on the surfaces of recording media, and the surfaces of the recording media have granulated roughness.

The mechanism in which the addition of a dialkylene glycol as well as a slightly water-soluble alkanediol and a water-soluble 1,2-alkanediol as essential components results in images with high quality without white streaks or roughness remains uncertain. However, the mechanism is presumably as follows.

Agglomeration of ink occurring in recording on coated printing paper is presumably caused because ink dots have high surface tension and the contact angle between a surface of coated printing paper and ink droplets is high and hence coated printing paper rejects ink. Even when white streaks and filling failure occur in recording at a low resolution, a decrease in the surface tension of ink adhering to a surface of coated printing paper reduces the agglomeration of the ink.

White streaks and filling failure occurring in recording at a low resolution are presumably caused because ink dots adhering to a surface of coated printing paper come into contact with neighboring ink dots and the wet ink dots spread to each other, so that the undried ink flows among the ink dots. This ink flowing among ink dots is probably caused because ink dots have different drying times caused by a difference in time of adhering between neighboring ink dots, the size of droplets at the time of adhering, and the like. Thus, to reduce agglomeration of ink and to provide images with high quality without white streaks or roughness even when the images are printed at a low resolution, ink having a low surface tension and a low flowability is preferably made to adhere to coated printing paper.

However, unless a permeable lubricant is used to reduce the flowability of ink, ink dots adhering to a surface of coated printing paper dry more rapidly and the ink is also absorbed more rapidly. Thus, the time in which adhering wet ink dots spread to each other is not provided and, as a result, white streaks and filling failure are presumably caused in recording at a low resolution.

A dialkylene glycol used in the present invention is a substance having a viscosity improving property like glycerin. A dialkylene glycol is a permeable lubricant having a lower surface tension than glycerin. For example, a 10% aqueous solution of dipropylene glycol has a surface tension of 53 mN/m.

Combined use of, as an alcohol solvent, a slightly water-soluble alkanediol, a water-soluble 1,2-alkanediol, and a dialkylene glycol provides ink having a better drying property than in use of a slightly water-soluble alkanediol, a water-soluble 1,2-alkanediol, and an alkanetriol. This is presumably one reason why images with high quality can be provided not only on recording media having low capability of absorbing liquid such as coated printing paper but also on recording media having no capability of absorbing liquid such as resin films.

The slightly water-soluble alkanediol in the present invention is preferably an alkanediol having seven or more carbon atoms. Examples of such an alkanediol include 1,2-heptanediol, 1,2-octanediol, 5-methyl-1,2-hexanediol, 4-methyl-1,2-hexanediol, and 4,4-dimethyl-1,2-pentanediol. Among these alkanediols, 1,2-octanediol is more preferable.

The water-soluble 1,2-alkanediol is preferably an alkanediol having six or less carbon atoms. Examples of such an alkanediol include 1,2-hexanediol, 1,2-pentanediol, 1,2-butanediol, 4-methyl-1,2-pentanediol, and 3,3-dimethyl-1,2-butanediol. Among these alkanediols, more preferred are water-soluble alkanediols that have a surface tension of 28 mN/m or less when turned into 15% aqueous solutions. Particularly preferred are 1,2-hexanediol (surface tension: 26.7 mN/m), 4-methyl-1,2-pentanediol (surface tension: 25.4 mN/m), and 3,3-dimethyl-1,2-butanediol (surface tension: 26.1 mN/m). In view of odor during printing, 1,2-hexanediol is preferred.

The dialkylene glycol, which is a dehydration condensation product derived from an alkyleneglycol, in the present invention is preferably a dialkylene glycol having two to four carbon atoms. Examples of such a dialkylene glycol include diethylene glycol and dibutadiene glycol.

Among these dialkylene glycols, more preferred are dialkylene glycols that have a surface tension of 60 mN/m or less when turned into 10% aqueous solutions. Particularly preferred is dipropylene glycol (surface tension: 53 mN/m).

As for the three types of alcohol solvents described above, the content ratio of the slightly water-soluble alkanediol to the water-soluble 1,2-alkanediol is preferably 6:1 to 1:3, more preferably 6:1 to 1:1. By achieving this range, the slightly water-soluble alkanediol can be stably dissolved in ink, thereby enhancing the ejection stability of the ink. When the proportion of the water-soluble 1,2-alkanediol is larger than this range, it is difficult to achieve both reduction of the initial viscosity of ink and reduction of agglomeration irregularities. When the proportion of the water-soluble 1,2-alkanediol is less than this range, it is difficult to dissolve the slightly water-soluble alkanediol stably in ink, resulting in difficulties in suppressing changes in viscosity of the ink over time and in maintaining storage stability of the ink.

The content of the slightly water-soluble alkanediol to the dialkylene glycol is preferably 1:1 to 1:18, more preferably 1:1 to 1:6. By achieving this range, the initial viscosity of ink can be reduced and a good clogging recovery property can be achieved. When the proportion of the dialkylene glycol is larger than this range, the initial viscosity of ink is increased and the drying property of the ink is degraded. When the proportion of the dialkylene glycol is less than this range, the clogging recovery property is degraded and the drying property is enhanced. As a result, time in which wet ink spreads cannot be provided and hence the ink cannot cover recording media, thereby increasing the occurrence of white streaks.

The content ratio of the water-soluble 1,2-alkanediol to the dialkylene glycol is preferably 1:1 to 1:36, more preferably 1:1 to 1:18. By achieving this range, white streaks and roughness can be further reduced in printing at a low resolution on coated printing paper. When the proportion of the water-soluble 1,2-alkanediol is larger than this range, the initial viscosity of ink is increased and the drying property of the ink is degraded. When the proportion of the dialkylene glycol is less than this range, the clogging recovery property is degraded and the drying property is enhanced. As a result, time in which wet ink spreads cannot be provided and hence the ink cannot cover recording media, thereby increasing the occurrence of white streaks.

The content of the slightly water-soluble alkanediol is preferably 1 to 3 wt %, more preferably 1.5 to 2.5 wt %, based on the total ink composition. When the content is less than 1 wt %, printing irregularities may be generated on recording media having low capability of absorbing ink such as coated printing paper. In contrast, when the content is more than 3 wt %, a case where the slightly water-soluble alkanediol is not completely dissolved in ink may occur.

The content of the water-soluble 1,2-alkanediol is preferably 0.5 to 6 wt %, more preferably 0.5 to 3.0 wt %. When the content is less than 0.5 wt %, a case where the slightly water-soluble alkanediol cannot be dissolved in ink may occur. In contrast, when the content is more than 6 wt %, the initial viscosity of ink may be increased, which is not preferable.

The content of the dialkylene glycol is preferably 3 to 18 wt %, more preferably 5 to 8 wt %, based on the total ink composition. When the content is less than 3 wt %, white streaks or roughness may occur in printing at a low resolution on coated printing paper. In contrast, when the content is more than 18 wt %, the drying property of printed products immediately after printing may be poor.

<Colorant>

A colorant used for an ink composition for ink jet recording according to the present invention may be a dye or a pigment. However, in view of light fastness and water resistance, pigments can be preferably used.

Such a pigment may be an inorganic pigment or an organic pigment and may be used alone or in combination. Examples of the inorganic pigment include titanium oxide, iron oxide, and carbon black produced by a known method such as a contact method, a furnace method, or a thermal method. Examples of the organic pigment include azo pigments such as azo lake, insoluble azo pigments, condensation azo pigments, and chelate azo pigments; polycyclic pigments such as phthalocyanine pigments, perylene pigments, perinone pigments, anthraquinone pigments, quinacridon pigments, dioxazine pigments, thioindigo pigments isoindolinone pigments, and quinophlalone pigments; dye chelates such as basic dye chelates and acidic dye chelates; nitro pigments; nitroso pigments; and aniline black.

Specific examples of such a pigment can be properly listed in accordance with the type (color) of a desired ink composition. Examples of a pigment for an yellow ink composition include C.I. Pigment Yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185. These pigments may be used alone or in combination. Among these pigments, one or more pigments selected from the group consisting of C.I. Pigment Yellows 74, 110, 128, and 147 are particularly preferably used. Examples of a pigment for a magenta ink composition include C.I. Pigment Reds 5, 7, 12, 48 (Ca), 48 (Mn), 57 (Ca), 57:1, 112, 122, 123, 168, 184, 202, and 209; and C.I. Pigment Violet 19. These pigments may be used alone or in combination. Among these pigments, one or more pigments selected from the group consisting of C.I. Pigment Reds 122, 202, and 209 and C.I. Pigment Violet 19 are particularly preferably used. Examples of a pigment for a cyan ink composition include C.I. Pigment Blues 1, 2, 3, 15:3, 15:4, 15:34, 16, 22, and 60; and Bat Blues 4 and 60. These pigments may be used alone or in combination. Among these pigments, use of C.I. Pigment Blue 15:3 and/or C.I. Pigment Blue 15:4 is particularly preferred and, in particular, use of C.I. Pigment Blue 15:3 is preferred.

Examples of a pigment for a black ink composition include inorganic pigments such as carbon blacks (C.I. Pigment Black 7) like furnace black, lamp black, acetylene black, and channel black, and iron oxide pigments; and organic pigments such as aniline black (C.I. Pigment Black 1). In the present invention, carbon blacks are preferably used. Specific examples of carbon blacks include #2650, #2600, #2300, #2200, #1000, #980, #970, #966, #960, #950, #900, #850, MCF-88, #55, #52, #47, #45, #45L, #44, #33, #32, #30 (these listed so far are manufactured by Mitsubishi Chemical Corporation), SpecialBlaek4A, 550, Printex95, 90, 85, 80, 75, 45, 40 (these listed so far are manufactured by Degussa Corporation), Rega1660, Rmogu1L, monarch1400, 1300, 1100, 800, 900 (these listed so far are manufactured by Cabot Corporation), Raven 7000, 5750, 5250, 3500, 3500, 2500ULTRA, 2000, 1500, 1255, 1200, 1190ULTRA, 1170, 1100ULTRA, and Raven5000 UIII (these listed so far are manufactured by Columbian Corporation).

The concentration of a pigment is not particularly restricted because it should be adjusted to an appropriate concentration (content) when an ink composition is prepared. However, the concentration of a pigment is generally 5 to 20 wt %.

The pigments described above are preferably pigments that have been kneaded with a dispersing agent described below because use of such a pigment results in sufficient gloss and prevention of bronzing in images, also results in sufficient storage stability of an ink composition, and permits formation of color images having more excellent gloss.

<Dispersing agent>

An ink composition according to the present invention preferably contains, as a dispersing agent for dispersing a colorant, at least one resin selected from styrene-acrylic-acid-based copolymer resins, urethane-based resins, and fluorene-based resins. These copolymer resins adsorb to pigments, thereby enhancing the dispersion properties of the pigments. The dispersing agent may be present in an amount of 1.0 to 6.0 wt % based on the ink composition.

Specific examples of a hydrophobic monomer for the copolymer resins include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methyl styrene, and vinyltoluene. These monomers may be used alone or in combination.

Specific examples of a hydrophilic monomer include acrylic acid, methacrylic acid, maleic acid, and itaconic acid.

In view of achieving sufficient gloss and prevention of bronzing in color images and achieving sufficient storage stability of an ink composition, and permitting formation of color images having more excellent gloss, a copolymer resin of the hydrophobic monomer and the hydrophilic monomer is preferably at least any one of styrene-(meth)acrylic acid copolymer resins, styrene-methyl styrene-(meth)acrylic acid copolymer resins, styrene-maleic acid copolymer resins, (meth)acrylic acid-(meth)acrylate copolymer resins, and styrene-(meth)acrylic acid-(meth)acrylate copolymer resins.

Alternatively, the copolymer resin may be a resin (styrene-acrylic acid resin) containing a polymer obtained by effecting reaction between styrene and acrylic acid or acrylate. Alternatively, the copolymer resin may be an acrylic-acid-based water-soluble resin. Alternatively, the copolymer resin may be a salt of these resins such as a sodium salt, a potassium salt, or an ammonium salt.

In view of achieving sufficient gloss and prevention of bronzing in color images and achieving sufficient storage stability of an ink composition, and permitting formation of color images having more excellent gloss, the content of such a copolymer resin is preferably 10 to 50 parts by weight, more preferably 10 to 35 parts by weight, based on 100 parts by weight of the pigment described above.

In the present invention, use of a urethane resin as a pigment dispersing agent results in sufficient gloss and prevention of bronzing in color images, also results in sufficient storage stability of an ink composition, and permits formation of color images having more excellent gloss. A urethane resin is a resin containing a polymer obtained by effecting reaction between a diisocyanate compound and a diol compound. A urethane resin used in the present invention is preferably a resin containing a urethane bond and/or an amide bond and an acidic group.

Examples of the diisocyanate compound include aromatic aliphatic diisocyanate compounds such as hexamethylenediisocyanate and 2,2,4-trimethylhexamethylene diisocyanate, aromatic diisocyanate compounds such as tolylene diisocyanate and phenylmethane diisocyanate, and modified compounds of the foregoing.

Examples of the diol compound include polyether-based compounds such as polyethylene glycol and polypropylene glycol, polyester-based compounds such as polyethylene adipate and polybutylene adipate, and polycarbonate-based compounds.

The urethane resin preferably contains a carboxyl group.

In the present invention, a fluorene-based resin may also be used as a pigment dispersing agent.

The weight ratio between the copolymer resin and the urethane resin (the former/the latter) is preferably 1/2 to 2/1. In view of achieving sufficient gloss and prevention of bronzing in color images and also achieving sufficient storage stability of an ink composition, and permitting formation of color images having more excellent gloss, the weight ratio is more preferably 1/1.5 to 1.5/1.

The weight ratio between the solid content of the pigment and solid content other than the pigment (the former/the latter) is preferably 100/20 to 100/80 in view of achieving sufficient gloss and prevention of bronzing in color images and also achieving sufficient storage stability of an ink composition, and permitting formation of color images having more excellent gloss.

The content of the copolymer resin is preferably 10 to 50 parts by weight, more preferably 10 to 35 parts by weight, based on 100 parts by weight of the pigment described above in view of achieving sufficient gloss and prevention of bronzing in color images and also achieving sufficient storage stability of an ink composition, and permitting formation of color images having more excellent gloss.

The content of the urethane resin is preferably 10 to 40 parts by weight, more preferably 10 to 35 parts by weight, based on 100 parts by weight of the pigment described above in view of achieving sufficient gloss and prevention of bronzing in color images and also achieving sufficient storage stability of an ink composition, and permitting formation of color images having more excellent gloss.

The content of the fluorene-based resin is preferably 20 to 200 parts by weight, more preferably 10 to 80 parts by weight, based on 100 parts by weight of the pigment described above in view of achieving sufficient gloss and prevention of bronzing in color images and also achieving sufficient storage stability of an ink composition, and permitting formation of color images having more excellent gloss.

The total amount of the copolymer resin and the urethane resin to be used is preferably 90 parts by weight or less (more preferably 70 parts by weight or less) based on 100 parts by weight of the pigment described above in view of achieving sufficient gloss and prevention of bronzing in color images and also achieving sufficient storage stability of an ink composition, and permitting formation of color images having more excellent gloss.

The acid value of the copolymer resin is preferably 50 to 320, more preferably 100 to 250, in view of achieving sufficient gloss and prevention of bronzing in color images and also achieving sufficient storage stability of an ink composition, and permitting formation of color images having more excellent gloss.

The acid value of the urethane resin is preferably 10 to 300, more preferably 20 to 100, in view of achieving sufficient gloss and prevention of bronzing in color images and also achieving sufficient storage stability of an ink composition, and permitting formation of color images having more excellent gloss. The acid value is an amount (mg) of KOH required for neutralizing 1 g of a resin.

The weight-average molecular weight (Mw) of the copolymer resin is preferably 2,000 to 30,000, more preferably 2,000 to 20,000, in view of achieving sufficient gloss and prevention of bronzing in color images and also achieving sufficient storage stability of an ink composition, and permitting formation of color images having more excellent gloss.

The weight-average molecular weight (Mw) of the urethane resin before being crosslinked is preferably 100 to 200,000, more preferably 1,000 to 50,000, in view of achieving sufficient gloss and prevention of bronzing in color images and also achieving sufficient storage stability of an ink composition, and permitting formation of color images having more excellent gloss. Mw is determined by, for example, GPC (gel permeation chromatography).

The glass transition temperature (Tg; determined in accordance with JISK6900) of the copolymer resin is preferably 30° C. or more, more preferably 50° C. to 130° C., in view of achieving sufficient gloss and prevention of bronzing in color images and also achieving sufficient storage stability of an ink composition, and permitting formation of color images having more excellent gloss.

The glass transition temperature (Tg; determined in accordance with JISK6900) of the urethane resin is preferably −50° C. to 200° C., more preferably −50° C. to 100° C., in view of achieving sufficient gloss and prevention of bronzing in color images and also achieving sufficient storage stability of an ink composition, and permitting formation of color images having more excellent gloss.

The copolymer resin in a fluid dispersion of a pigment adsorbs to the pigment or is free from the pigment. The largest particle size of the copolymer resin is preferably 0.3 µm or less and the average particle size of the copolymer resin is more preferably 0.2 µm or less (still more preferably 0.1 µm or less) in view of achieving sufficient gloss and prevention of bronzing in color images and also achieving sufficient storage stability of an ink composition, and permitting formation of color images having more excellent gloss. The average particle size is an average value of dispersion size (50% cumulative size) of particles actually formed of a pigment in a fluid dispersion. The average particle size can be determined with, for example, a Microtrac UPA (Microtrac Inc.)

The fluorene resin described above is not restricted as long as the resin has a fluorene structure. The fluorene resin can be obtained by, for example, copolymerizing the following monomer units.

cyclohexane, 5-isocyanate-1-(isocyanatemethyl)-1,3,3-trimethyl (CAS No. 4098-71-9)

ethanol, 2,2'-[9H-fluorene-9-ylidenebis(4,1-phenyleneoxy)]bis (CAS No. 117344-32-8)

propionic acid, 3-hydroxy-2-(hydroxymethyl)-2-methyl (CAS No. 4767-03-7)

ethanamine, N,N-diethyl (CAS No. 121-44-8)

Alternatively, a surfactant may also be used as a dispersing agent. Examples of such a surfactant include anionic surfactants such as fatty acid salts, higher alkyl dicarboxylates, higher alcohol sulfates, higher alkyl sulfonates, condensation products between higher fatty acids and amino acids, sulfosuccinates, naphthenates, liquid fatty oil sulfates, and alkylaryl sulfonates; cationic surfactants such as fatty acid amine salts, quaternary ammonium salts, sulfonium salts, and phosphonium; and nonionic surfactants such as polyoxyethylene alkyl ethers, polyoxyethylene alkyl esters, sorbitan alkyl esters, and polyoxyethylene sorbitan alkyl esters. When the surfactants described above are added to ink compositions, as a matter of course, the surfactants also function as surfactants.

<Surfactants>

An ink composition for ink jet recording according to the present invention contains a surfactant as an essential component. By using a surfactant for recording media on the surfaces of which a resin for receiving ink is coated, images having excellent gloss can be provided even for recording media such as photographic paper, in which gloss is more valued. In particular, even when recording media, such as coated printing paper, having a coated layer for receiving oil based ink in the reception layer on the surfaces of the media are used, use of a surfactant can prevent bleeding of colors and blushing caused by reflected light, the blushing occurring with an increase in the adhesion amount of ink.

For a surfactant used in the present invention, organopolysiloxane-based surfactants are preferably used. Use of organopolysiloxane-based surfactants enhances the wettability of the surfaces of recording media in formation of recording images, thereby enhancing permeability of ink for the surfaces of recording media. When an organopolysiloxane-based surfactant is used, since the ink composition contains three types of alcohol solvents as described above, the surfactant exhibits an enhanced solubility in the ink, thereby reducing the occurrence of generation of insoluble matter and the like. Thus, an ink composition exhibiting more excellent ejection stability can be provided.

For the surfactant described above, commercially available surfactants may be used. Examples of such surfactants include OLFINE PD-501 (manufactured by Nissin Chemical Industry Co., Ltd.), OLFINE PD-502 (manufactured by Nissin Chemical Industry Co., Ltd.), and OLFINE PD-570 (manufactured by Nissin Chemical Industry Co., Ltd.)

The organopolysiloxane-based surfactant more preferably contains one or more compounds represented by the following Formula (I):

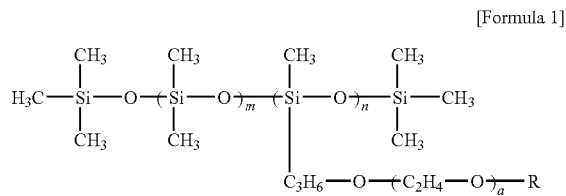

[Formula 1]

(In the formula, R represents a hydrogen atom or a methyl group, a represents an integer of 2 to 11, m represents an integer of 2 to 50, and n represents an integer of 1 to 5.), or one or more compounds represented by the above Formula (I) wherein R represents a hydrogen atom or a methyl group, a represents an integer of 2 to 13, m represents an integer of 2 to 50, and n represents an integer of 1 to 5. More preferably, the organopolysiloxane-based surfactant contains one or more compounds represented by the above Formula (I) wherein R represents a hydrogen atom or a methyl group, a represents an integer of 2 to 13, m represents an integer of 2 to 50, and n represents an integer of 1 to 8. More preferably, the organopolysiloxane-based surfactant contains one or more compounds represented by the above Formula (I) wherein R represents a methyl group, a represents an integer of 6 to 18, m represents 0, and n represents 1. Use of such specific organopolysiloxane-based surfactants further reduces agglomeration irregularities of ink even when coated printing paper is used as a recording media in printing.

As for compounds according to Formula (I) above, more preferred are compounds in which a represents an integer of 2 to 5, m represents an integer of 20 to 40, and n represents an integer of 2 to 4; compounds in which a represents an integer of 7 to 11, m represents an integer of 30 to 50, and n represents an integer of 3 to 5; compounds in which a represents an integer of 9 to 13, m represents an integer of 2 to 4, and n represents an integer of 1 to 2; or compounds in which a represents an integer of 6 to 10, m represents an integer of 10 to 20, and n represents an integer of 4 to 8. Use of such compounds further reduces agglomeration irregularities of ink. For example, a surfactant is composed of a mixture of a compound according to Formula (I) above wherein R represents a methyl group, a represents an integer of 9 to 13, m represents an integer of 2 to 4, and n represents an integer of 1 to 2; and a compound according to Formula (I) above wherein R represents a hydrogen atom, a represents an integer of 7 to 11, m represents an integer of 30 to 50, and n represents an integer of 3 to 5.

More preferred is to use a compound according to Formula (I) above wherein R represents a hydrogen atom, a represents an integer of 2 to 5, m represents an integer of 20 to 40, and n represents an integer of 2 to 4; or a compound according to Formula (I) above wherein a represents an integer of 7 to 11, m represents an integer of 30 to 50, and n represents an integer of 3 to 5. Use of such a compound further reduces agglomeration irregularities and bleeding of ink.

More preferred is to use a compound according to Formula (I) above wherein R represents a methyl group, a represents an integer of 9 to 13, m represents an integer of 2 to 4, and n represents an integer of 1 to 2; or a compound according to Formula (I) above wherein a represents an integer of 6 to 10, m represents an integer of 10 to 20, and n represents an integer of 4 to 8. Use of such a compound further reduces agglomeration irregularities and bleeding of ink.

More preferred is to use a compound according to Formula (I) above wherein R represents a methyl group, a represents an integer of 6 to 12, m represents 0, and n represents 1. Use of such a compound further reduces agglomeration irregularities and bleeding of ink.

Most preferred is to use a mixture of a compound according to Formula (I) above wherein R represents a hydrogen atom, a represents an integer of 7 to 11, m represents an integer of 30 to 50, and n represents an integer of 3 to 5; a compound according to Formula (I) above wherein R represents a methyl group, a represents an integer of 9 to 13, m represents an integer of 2 to 4, and n represents an integer of 1 to 2; and a compound according to Formula (I) above wherein R represents a methyl group, a represents an integer of 6 to 10, m represents an integer of 10 to 20, and n represents an integer of 4 to 8. Use of such compounds still further reduces agglomeration irregularities and bleeding of ink.

Most preferred is to use a mixture of a compound according to Formula (I) above wherein R represents a hydrogen atom, a represents an integer of 7 to 11, m represents an integer of 30 to 50, and n represents an integer of 3 to 5; a compound according to Formula (I) above wherein R represents a methyl group, a represents an integer of 9 to 13, m represents an integer of 2 to 4, and n represents an integer of 1 to 2; and a compound according to Formula (I) above wherein R represents a methyl group, a represents an integer of 6 to 18, m represents 0, and n represents 1. Use of such compounds still further reduces agglomeration irregularities and bleeding of ink.

An ink composition according to the present invention preferably contains the surfactant described above in 0.01 to 1.0 wt %, more preferably 0.05 to 0.50 wt %. Combined use of the surfactant described above with R being a methyl group and the surfactant described above with R being a hydrogen atom is more preferable because letters in a small font are not blurred. In particular, the content of a surfactant is preferably larger in the case of using the surfactant described above with R being a methyl group than in the case of using the surfactant described above with R being H in view of agglomeration irregularities of ink.

The more content of the surfactant described above with R being a hydrogen atom is more preferable for the surfactant described above with R being a methyl group. As a result, agglomeration irregularities and bleeding of ink can be reduced even in coated printing paper that tends to reject ink and has a slow ink permeation speed such as cast coated paper.

An ink composition according to the present invention may further contain other surfactants, specifically, an acetylene-glycol-based surfactant, an anionic surfactant, a nonionic surfactant, an ampholytic surfactant, or the like.

Examples of the acetylene-glycol-based surfactant include 2,4,7,9-tetramethyl-5-decyne-4,7-diol, 3,6-dimethyl-4-octyne-3,6-diol, 3,5-dimethyl-1-hexyne-3ol, and 2,4-dimethyl-5-hexyne-3-ol. For the acetylene-glycol-based surfactant, commercially available surfactants may be used. Examples of such surfactants include OLFINE E1010, STG, Y (trade name, manufactured by Nissin Chemical Industry Co., Ltd.), and Surfynol 61, 104, 82, 465, 485, and TG (trade name, manufactured by Air Products and Chemicals Inc.)

<Water and Other Components>

An ink composition for ink jet recording according to the present invention contains water as a solvent as well as the specific alcohol solvents described above, a surfactant, and other various additives. For water, preferably used is pure water or ultrapure water such as ion-exchanged water, ultrafiltration water, reverse osmosis water, or distilled water. In particular, preferred are these waters that have been subjected to a sterilization treatment such as ultraviolet radiation or addition of hydrogen peroxide because generation of fungi and bacteria is prevented for a long period of time.

It is preferred that an ink composition according to the present invention contain a permeating agent in addition to the components described above.

Preferred examples of the permeating agent are glycol ethers.

Specific examples of the glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. These glycol ethers can be used alone or in combination.

Among the glycol ethers described above, preferred are alkyl ethers of polyhydric alcohols. In particular, preferred are ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol monobutyl ether, triethylene glycol monomethyl ether, triethylene glycol monoethyl ether, and triethylene glycol mono-n-butyl ether. More preferred is triethylene glycol mono-n-butyl ether.

The amount of the permeating agent to be added may be properly determined. The amount is preferably about 0.1 to wt % and more preferably about 1 to 20 wt %.

It is preferred that an ink composition according to the present invention contain a recording-media solubilizer in addition to the components described above.

Preferred examples of the recording-media solubilizer are pyrrolidones such as N-methyl-2-pyrrolidone. The amount of the recording-media solubilizer to be added may be properly determined. The amount is preferably about 0.1 to 30 wt % and more preferably about 1 to 20 wt %.

It is preferred that an ink composition for ink jet recording according to the present invention does not substantially contain a moistening agent. Since a moistening agent serves to prevent ink from drying and solidifying in ink jet nozzles and the like, ink does not dry after being ejected onto synthetic paper having films with low capability of absorbing ink, which can cause a problem in high-speed printing. When ink containing a moistening agent is used, subsequent ink is put on a recording medium on which unabsorbed ink is still present. This can cause generation of agglomeration irregularities.

For these reasons, substantial absent of a moistening agent is preferred in the present invention when recording media having low capability of absorbing ink are used. When ink has dried and solidified in ink jet nozzles, the dried ink can be dissolved again with a solution containing a moistening agent.

In particular, substantial absent of a moistening agent having a vapor pressure of 2 mPa or less at 25° C. is preferred in the present invention. "Substantial absent" refers to that the amount of such a moistening agent to be added is less than 1 wt % based on an ink composition.

When the content of a moistening agent having a vapor pressure of 2 mPa or less at 25° C. is less than 1 wt % based on ink, printing can be conducted by an ink jet recording method not only for recording media having low capability of absorbing ink such as coated printing paper but also for metal and plastic that has no capability of absorbing ink. It is obvious to those skilled in the art that some permeating solvents described above also function as moistening agents. However, it is understood in the present specification that the permeating solvents described above are not categorized as moistening agents. Also, it is understood in the present specification that the alcohol solvents described above are not categorized as moistening agents.

Moistening agents in the present specification refer to moistening agents used for ordinary ink for ink jet recording. Specific examples of such moistening agents include glycerin, ethylene glycol, water-soluble alkanediols having three to five carbon atoms such as 1,3-propanediol, 3-methyl-1,3-butanediol, 1,3-butanediol, and 1,2-pentanediol, trimethylolpropane, trimethylolmethane, and trimethylolethane.

An ink composition according to the present invention may further contain an agent for preventing clogging of nozzles, a preservative, an anti-oxidizing agent, a conductivity adjusting agent, a pH adjusting agent, a viscosity modifier, a surface tension adjusting agent, an oxygen absorbent, or the like.

Examples of the preservative and a fungicide include sodium benzoate, sodium pentachlorophenol, sodium 2-pyridinethiol-1-oxide, sodium sorbate, sodium dehydroacetate, and 1,2-dibenzynethiazoline-3-one (Proxel CRL, Proxel BND, Proxel GXL, Proxel XL-2, and Proxel TN manufactured by ICI Corporation).

Examples of the pH adjusting agent, a solubilization agent, and the anti-oxidizing agent include amines such as diethanolamine, triethanolamine, propanolamine, and morpholine, and modified amines of the foregoing; inorganic salts such as potassium hydroxide, sodium hydroxide, and lithium hydroxide; ammonium hydroxide, quaternary ammonium hydroxide (tetramethylammonium and the like); carbonates such as potassium carbonate, sodium carbonate, and lithium carbonate; phosphates; N-methyl-2-pyrrolidone; ureas such as urea, thiourea, and tetramethylurea; allophanates such as allophanate, and methylallophanate; biurets such as biuret, dimethylbiuret, and tetramethylbiuret; and L-ascorbic acid, and salts of L-ascorbic acid.

An ink composition according to the present invention may further contain an anti-oxidizing agent and an ultraviolet absorbing agent. Examples of such agents include Tinuvin 328, 900, 1130, 384, 292, 123, 144, 622, 770, and 292, Irgacor 252 153, Irganox 1010, 1076, and 1035, MD 1024, (manufactured by Ciba Specialty Chemicals), and oxides of lanthanide.

An ink composition according to the present invention can be prepared by dispersing and mixing the components described above by a proper method. Preferably, a pigment, a polymer dispersing agent, and water are mixed with a proper dispersing apparatus such as a ball mill, a sand mill, an attritor, a roll mill, an agitator mill, a Henschel mixer, a colloid mill, an ultrasonic homogenizer, a jet mill, or an Angmill to prepare a fluid dispersion in which the pigment is uniformly dispersed. After that, a separately prepared resin (resin emulsion), water, a water-soluble organic solvent, sugar, a pH adjusting agent, a preservative, a fungicide, and the like are added to the fluid dispersion and fully dissolved to prepare an ink solution. The solution is fully stirred and subsequently filtrated for removing coarse particles and impurities that cause clogging. Thus, a target ink composition is obtained.

Ink Jet Recording Method

In an ink jet recording method according to the present invention, printing is conducted by ejecting droplets of the ink composition described above and making the droplets to adhere to recording media. In the recording method according to the present invention, use of synthetic paper or coated printing paper as recording media is preferred. In particular, images with high quality without white streaks or roughness can be provided even when the images are printed at a low resolution on art paper, high quality paper for POD (print on demand) applications, or special paper for laser printers. Examples of the high quality paper for POD applications include Ricoh business coat gloss 100 (manufactured by Ricoh Company, Ltd.) Examples of the special paper for laser printers include LPCCTA4 (manufactured by SEIKO EPSON CORPORATION).

EXAMPLES

Hereinafter, the present invention is described in further detail with reference to examples. However, the present invention is not restricted to these examples.

<Preparation of Ink Composition>

Inks were prepared by mixing components in accordance with compositions shown in Table 1 below and filtrating the resultant mixture through a 10 μm membrane filter. The styrene-acrylic-acid-based resin in Table 1 was a copolymer having a molecular weight of 1600 and an acid value of 150. The urethane-based resin was a copolymer having a molecular weight of 6000 and an acid value of 50. The fluorene resin was a resin that had a molecular weight of 3300 and contained a monomer having a fluorene structure and being designated as CAS No. 117344-32-8 in a monomer proportion of about 50 wt %. The surfactant used was an organopolysiloxane-based surfactant that was a mixture of a compound according to Formula (I) above wherein R represents a methyl group, a represents an integer of 9 to 13, m represents an integer of 2 to 4, and n represents an integer of 1 to 2; and a compound according to Formula (I) above wherein R represents a hydrogen atom, a represents an integer of 7 to 11, m represents an integer of 30 to 50, and n represents an integer of 3 to 5.

TABLE 1

| | Composition | Example 1 Ink Set 1 | | | | Example 2 Ink Set 2 | | | | Example 3 Ink Set 3 | | | | Example 4 Ink Set 4 | | | |
|---|---|---|---|---|---|---|---|---|---|---|---|---|---|---|---|---|---|
| | | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 |
| | Urethane-based resin | — | — | — | — | — | — | — | — | — | — | — | — | — | — | — | — |
| | Fluorene-based resin | — | — | — | — | — | — | — | — | — | — | — | — | — | — | — | — |
| Alcohol solvent | Dipropylene glycol | 3 | 3 | 3 | 3 | 3 | 3 | 3 | 3 | 3 | 3 | 3 | 3 | 3 | 3 | 3 | 3 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

| | Composition | Example 5 Ink Set 5 | | | | Example 6 Ink Set 6 | | | | Example 7 Ink Set 7 | | | | Example 8 Ink Set 8 | | | |
|---|---|---|---|---|---|---|---|---|---|---|---|---|---|---|---|---|---|
| | | 5Y | 5M | 5C | 5K | 6Y | 6M | 6C | 6K | 7Y | 7M | 7C | 7K | 8Y | 8M | 8C | 8K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 |
| | Urethane-based resin | — | — | — | — | — | — | — | — | — | — | — | — | — | — | — | — |
| | Fluorene-based resin | — | — | — | — | — | — | — | — | — | — | — | — | — | — | — | — |
| Alcohol solvent | Dipropylene glycol | 8 | 8 | 8 | 8 | 8 | 8 | 8 | 8 | 8 | 8 | 8 | 8 | 8 | 8 | 8 | 8 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

TABLE 1-continued

| | | Example 9 Ink Set 9 | | | | Example 10 Ink Set 10 | | | | Example 11 Ink Set 11 | | | | Example 12 Ink Set 12 | | | |
|---|---|---|---|---|---|---|---|---|---|---|---|---|---|---|---|---|---|
| | Composition | 9Y | 9M | 9C | 9K | 10Y | 10M | 10C | 10K | 11Y | 11M | 11C | 11K | 12Y | 12M | 12C | 12K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 | 3.2 |
| | Urethane-based resin | — | — | — | — | — | — | — | — | — | — | — | — | — | — | — | — |
| | Fluorene-based resin | — | — | — | — | — | — | — | — | — | — | — | — | — | — | — | — |
| Alcohol solvent | Dipropylene glycol | 18 | 18 | 18 | 18 | 18 | 18 | 18 | 18 | 18 | 18 | 18 | 18 | 18 | 18 | 18 | 18 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

| | | Example 13 Ink Set 13 | | | | Example 14 Ink Set 14 | | | | Example 15 Ink Set 15 | | | | Example 16 Ink Set 16 | | | |
|---|---|---|---|---|---|---|---|---|---|---|---|---|---|---|---|---|---|
| | Composition | 13Y | 13M | 13C | 13K | 14Y | 14M | 14C | 14K | 15Y | 15M | 15C | 15K | 16Y | 16M | 16C | 16K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene-based resin | — | — | — | — | — | — | — | — | — | — | — | — | — | — | — | — |
| Alcohol solvent | Dipropylene glycol | 3 | 3 | 3 | 3 | 3 | 3 | 3 | 3 | 3 | 3 | 3 | 3 | 3 | 3 | 3 | 3 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

TABLE 1-continued

| | Composition | Example 17 Ink Set 17 | | | | Example 18 Ink Set 18 | | | | Example 19 Ink Set 19 | | | | Example 20 Ink Set 20 | | | |
|---|---|---|---|---|---|---|---|---|---|---|---|---|---|---|---|---|---|
| | | 17Y | 17M | 17C | 17K | 18Y | 18M | 18C | 18K | 19Y | 19M | 19C | 19K | 20Y | 20M | 20C | 20K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene-based resin | — | — | — | — | — | — | — | — | — | — | — | — | — | — | — | — |
| Alcohol solvent | Dipropylene glycol | 8 | 8 | 8 | 8 | 8 | 8 | 8 | 8 | 8 | 8 | 8 | 8 | 8 | 8 | 8 | 8 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

| | Composition | Example 21 Ink Set 21 | | | | Example 22 Ink Set 22 | | | | Example 23 Ink Set 23 | | | | Example 24 Ink Set 24 | | | |
|---|---|---|---|---|---|---|---|---|---|---|---|---|---|---|---|---|---|
| | | 21Y | 21M | 21C | 21K | 22Y | 22M | 22C | 22K | 23Y | 23M | 23C | 23K | 24Y | 24M | 24C | 24K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene-based resin | — | — | — | — | — | — | — | — | — | — | — | — | — | — | — | — |
| Alcohol solvent | Dipropylene glycol | 18 | 18 | 18 | 18 | 18 | 18 | 18 | 18 | 18 | 18 | 18 | 18 | 18 | 18 | 18 | 18 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

TABLE 1-continued

| | | Example 25 Ink Set 25 | | | | Example 26 Ink Set 26 | | | | Example 27 Ink Set 27 | | | | Example 28 Ink Set 28 | | | |
|---|---|---|---|---|---|---|---|---|---|---|---|---|---|---|---|---|---|
| | Composition | 25Y | 25M | 25C | 25K | 26Y | 26M | 26C | 26K | 27Y | 27M | 27C | 27K | 28Y | 28M | 28C | 28K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | — | — | — | — | — | — | — | — | — | — | — | — | — | — | — | — |
| | Fluorene-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alcohol solvent | Dipropylene glycol | 3 | 3 | 3 | 3 | 3 | 3 | 3 | 3 | 3 | 3 | 3 | 3 | 3 | 3 | 3 | 3 |
| | 1,2-Hexanediol | 0.5 | 0.5 | 0.5 | 0.5 | 0.5 | 0.5 | 0.5 | 0.5 | 1 | 1 | 1 | 1 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

| | | Example 29 Ink Set 29 | | | | Example 30 Ink Set 30 | | | | Example 31 Ink Set 31 | | | | Example 32 Ink Set 32 | | | |
|---|---|---|---|---|---|---|---|---|---|---|---|---|---|---|---|---|---|
| | Composition | 29Y | 29M | 29C | 29K | 30Y | 30M | 30C | 30K | 31Y | 31M | 31C | 31K | 32Y | 32M | 32C | 32K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | — | — | — | — | — | — | — | — | — | — | — | — | — | — | — | — |
| | Fluorene-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alcohol solvent | Dipropylene glycol | 8 | 8 | 8 | 8 | 8 | 8 | 8 | 8 | 8 | 8 | 8 | 8 | 8 | 8 | 8 | 8 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

TABLE 1-continued

| | Composition | Example 33 Ink Set 33 | | | | Example 34 Ink Set 34 | | | | Example 35 Ink Set 35 | | | | Example 36 Ink Set 36 | | | |
|---|---|---|---|---|---|---|---|---|---|---|---|---|---|---|---|---|---|
| | | 33Y | 33M | 33C | 33K | 34Y | 34M | 34C | 34K | 35Y | 35M | 35C | 35K | 36Y | 36M | 36C | 36K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | — | — | — | — | — | — | — | — | — | — | — | — | — | — | — | — |
| | Fluorene-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alcohol solvent | Dipropylene glycol | 18 | 18 | 18 | 18 | 18 | 18 | 18 | 18 | 18 | 18 | 18 | 18 | 18 | 18 | 18 | 18 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

| | Composition | Example 37 Ink Set 37 | | | | Example 38 Ink Set 38 | | | | Example 39 Ink Set 39 | | | | Example 40 Ink Set 40 | | | |
|---|---|---|---|---|---|---|---|---|---|---|---|---|---|---|---|---|---|
| | | 37Y | 37M | 37C | 37K | 38Y | 38M | 38C | 38K | 39Y | 39M | 39C | 39K | 40Y | 40M | 40C | 40K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | — | — | — | — | — | — | — | — | — | — | — | — | — | — | — | — |
| | Urethane-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| Alcohol solvent | Dipropylene glycol | 3 | 3 | 3 | 3 | 3 | 3 | 3 | 3 | 3 | 3 | 3 | 3 | 3 | 3 | 3 | 3 |
| | 1,2-Hexanediol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

TABLE 1-continued

| | Composition | Example 41 Ink Set 41 | | | | Example 42 Ink Set 42 | | | | Example 43 Ink Set 43 | | | | Example 44 Ink Set 44 | | | |
|---|---|---|---|---|---|---|---|---|---|---|---|---|---|---|---|---|---|
| | | 41Y | 41M | 41C | 41K | 42Y | 42M | 42C | 42K | 43Y | 43M | 43C | 43K | 44Y | 44M | 44C | 44K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene-based resin | 8 | 8 | 8 | 8 | 8 | 8 | 8 | 8 | 8 | 8 | 8 | 8 | 8 | 8 | 8 | 8 |
| Alcohol solvent | Dipropylene glycol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Hexanediol | 1 | 1 | 1 | 1 | 3 | 3 | 3 | 3 | 1 | 1 | 1 | 1 | 3 | 3 | 3 | 3 |
| | 1,2-Octanediol | — | — | — | — | — | — | — | — | — | — | — | — | — | — | — | — |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

| | Composition | Example 45 Ink Set 45 | | | | Example 46 Ink Set 46 | | | | Example 47 Ink Set 47 | | | | Example 48 Ink Set 48 | | | |
|---|---|---|---|---|---|---|---|---|---|---|---|---|---|---|---|---|---|
| | | 45Y | 45M | 45C | 45K | 46Y | 46M | 46C | 46K | 47Y | 47M | 47C | 47K | 48Y | 48M | 48C | 48K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Fluorene-based resin | 18 | 18 | 18 | 18 | 18 | 18 | 18 | 18 | 18 | 18 | 18 | 18 | 18 | 18 | 18 | 18 |
| Alcohol solvent | Dipropylene glycol | 0.5 | 0.5 | 0.5 | 0.5 | 0.5 | 0.5 | 0.5 | 0.5 | 3 | 3 | 3 | 3 | 3 | 3 | 3 | 3 |
| | 1,2-Hexanediol | 1 | 1 | 1 | 1 | 3 | 3 | 3 | 3 | 1 | 1 | 1 | 1 | 3 | 3 | 3 | 3 |
| | 1,2-Octanediol | — | — | — | — | — | — | — | — | — | — | — | — | — | — | — | — |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

TABLE 1-continued

| | | Comparative Example 1 Ink Set 1 | | | | Comparative Example 2 Ink Set 2 | | | | Comparative Example 3 Ink Set 3 | | | | Comparative Example 4 Ink Set 4 | | | |
|---|---|---|---|---|---|---|---|---|---|---|---|---|---|---|---|---|---|
| | Composition | 1Y | 1M | 1C | 1K | 2Y | 2M | 2C | 2K | 3Y | 3M | 3C | 3K | 4Y | 4M | 4C | 4K |
| Colorant | C.I. Pigment Yellow 74 | 8.0 | — | — | — | 8.0 | — | — | — | 8.0 | — | — | — | 8.0 | — | — | — |
| | C.I. Pigment Red 122 | — | 8.0 | — | — | — | 8.0 | — | — | — | 8.0 | — | — | — | 8.0 | — | — |
| | C.I. Pigment Blue 15:4 | — | — | 8.0 | — | — | — | 8.0 | — | — | — | 8.0 | — | — | — | 8.0 | — |
| | C.I. Pigment Black 6 | — | — | — | 8.0 | — | — | — | 8.0 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 | 2.4 |
| | Urethane-based resin | — | — | — | — | — | — | — | — | — | — | — | — | — | — | — | — |
| | Fluorene-based resin | — | — | — | — | — | — | — | — | — | — | — | — | — | — | — | — |
| Alcohol solvent | Dipropylene glycol | 0 | 0 | 0 | 0 | 0 | 0 | 0 | 0 | 3 | 3 | 3 | 3 | 18 | 18 | 18 | 18 |
| | 1,2-Hexanediol | 0.5 | 0.5 | 0.5 | 0.5 | 3 | 3 | 3 | 3 | 0 | 0 | 0 | 0 | 0 | 0 | 0 | 0 |
| | 1,2-Octanediol | 1 | 1 | 1 | 1 | 3 | 3 | 3 | 3 | 1 | 1 | 1 | 1 | 3 | 3 | 3 | 3 |
| | Surfactant | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder | Remainder | Remainder | Remainder | Remainder | Remainder | Remainder | Remainder | Remainder |
| | Remainder | 100 | 100 | 100 | 100 | 100 | 100 | 100 | 100 | 100 | 100 | 100 | 100 | 100 | 100 | 100 | 100 |

| | | Comparative Example 5 Ink Set 5 | | | | Comparative Example 6 Ink Set 6 | | | |
|---|---|---|---|---|---|---|---|---|---|
| | Composition | 5Y | 5M | 5C | 5K | 6Y | 6M | 6C | 6K |
| Colorant | C.I. Pigment Yellow 74 | 8.0 | — | — | — | 8.0 | — | — | — |
| | C.I. Pigment Red 122 | — | 8.0 | — | — | — | 8.0 | — | — |
| | C.I. Pigment Blue 15:4 | — | — | 8.0 | — | — | — | 8.0 | — |
| | C.I. Pigment Black 6 | — | — | — | 8.0 | — | — | — | 8.0 |
| Dispersing agent | Styrene-acrylic-based resin | 2.4 | 2.4 | 2.4 | 2.4 | 2.4 | 2.4 | 2.4 | 2.4 |
| | Urethane-based resin | — | — | — | — | — | — | — | — |
| | Fluorene-based resin | — | — | — | — | — | — | — | — |
| Alcohol solvent | Dipropylene glycol | 3 | 3 | 3 | 3 | 18 | 18 | 18 | 18 |
| | 1,2-Hexanediol | 0.5 | 0.5 | 0.5 | 0.5 | 3 | 3 | 3 | 3 |
| | 1,2-Octanediol | 0 | 0 | 0 | 0 | 0 | 0 | 0 | 0 |
| | Surfactant | 0.1 | 0.1 | 0.1 | 0.1 | 0.1 | 0.1 | 0.1 | 0.1 |
| | Pure water | Remainder | Remainder | Remainder | Remainder | Remainder | Remainder | Remainder | Remainder |
| | Remainder | 100 | 100 | 100 | 100 | 100 | 100 | 100 | 100 |

Examples 49 to 96 and Comparative Examples 7 to 12

Example ink sets 49 to 96 and Comparative Example ink sets 7 to 12 were prepared as with the above-mentioned Example ink sets 1 to 48 and Comparative Example ink sets 1 to 6 except that the surfactant was replaced by the following surfactant.

The surfactant used in Example ink sets 49 to 96 and Comparative Example ink sets 7 to 12 was a surfactant composed of a compound according to Formula (I) above wherein R represents a methyl group, a represents an integer of 6 to 10, m represents an integer of 10 to 20, and n represents an integer of 4 to 8.

Examples 97 to 144 and Comparative Examples 13 to 18

Example ink sets 97 to 144 and Comparative Example ink sets 13 to 18 were prepared as with the above-mentioned Example ink sets 1 to 48 and Comparative Example ink sets 1 to 6 except that the surfactant was replaced by the following surfactant.

The surfactant used in Examples 97 to 144 and Comparative Examples 13 to 18 was a surfactant composed of a mixture of a compound according to Formula (I) above wherein R represents a hydrogen atom, a represents an integer of 7 to 11, m represents an integer of 30 to 50, and n represents an integer of 3 to 5; a compound according to Formula (I) above wherein R represents a methyl group, a represents an integer of 9 to 13, m represents an integer of 2 to 4, and n represents an integer of 1 to 2; and a compound according to Formula (I) above wherein R represents a methyl group, a represents an integer of 6 to 10, m represents an integer of 10 to 20, and n represents an integer of 4 to 8.

Examples 145 to 192 and Comparative Examples 19 to 24

Example ink sets 145 to 192 and Comparative Example ink sets 19 to 24 were prepared as with the above-mentioned Example ink sets 1 to 48 and Comparative Example ink sets 1 to 6 except that the surfactant was replaced by the following surfactant.

The surfactant used in Examples 145 to 192 and Comparative Examples 19 to 24 was a surfactant composed of a compound according to Formula (I) above wherein R represents a methyl group, a represents an integer of 6 to 18, m represents 0, and n represents 1.

Examples 193 to 240 and Comparative Examples 25 to 30

Example ink sets 193 to 240 and Comparative Example ink sets 25 to 30 were prepared as with the above-mentioned Example ink sets 1 to 48 and Comparative Example ink sets 1 to 6 except that the surfactant was replaced by the following surfactant.

The surfactant used in Examples 193 to 240 and Comparative Examples 25 to 30 was a surfactant composed of a mixture of a compound according to Formula (I) above wherein R represents a hydrogen atom, a represents an integer of 7 to 11, m represents an integer of 30 to 50, and n represents an integer of 3 to 5; a compound according to Formula (I) above wherein R represents a methyl group, a represents an integer of 9 to 13, m represents an integer of 2 to 4, and n represents an integer of 1 to 2; and a compound according to Formula (I) above wherein R represents a methyl group, a represents an integer of 6 to 18, m represents 0, and n represents 1.

<Evaluation>

Evaluation of Initial Viscosity of Ink

The thus-obtained inks were evaluated for ink viscosity. The viscosity of each ink was measured with a vibration viscometer (a model MV100 manufactured by Yamaichi Electronics Co, Ltd.) after a lapse of an hour from the preparation of the ink and evaluated in accordance with the following criteria. The measurement temperature was 20° C.

S: The viscosity is 4 mPa·s or less.
AA: The viscosity is more than 4 mPa·s and 5 mPa·s or less.
A: The viscosity is more than 5 mPa·s and 6 mPa·s or less.
B: The viscosity is more than 6 mPa·s and 7 mPa·s or less.
C: The viscosity is more than 7 mPa·s and 8 mPa·s or less.
D: The viscosity is more than 8 mPa·s.

The evaluation results are shown in the following Table 2.

Evaluation of Lapse Viscosity of Ink

The inks prepared above were left for three days at 70° C. After that, these inks were measured for their viscosity as in the above evaluation and evaluated in accordance with the following criteria.

A: The difference between the measured viscosity and the initial viscosity is 0.5 mPa·s or less.
B: The difference between the measured viscosity and the initial viscosity is more than 0.5 mPa·s and 1.0 mPa·s or less.
C: The difference between the measured viscosity and the initial viscosity is more than 1.0 mPa·s and 2.0 mPa·s or less.
D: The difference between the measured viscosity and the initial viscosity is more than 2.0 mPa·s.

The evaluation results are shown in the following Table 2.

Evaluation of Ink Agglomeration Irregularities and Filling Property for Media Other than Cast Coated Paper The Y, M, C, K inks obtained above were combined into ink sets and installed in the ink cartridge of an ink jet printer (PX-G920 manufactured by SEIKO EPSON CORPORATION) so that recording could be conducted at 720 dpi in the main scanning (head driving) direction and at 360 dpi in the subscanning (recording media transporting) direction. Next, the voltage of the printer was adjusted such that the size of a dot adhering to a recording medium at the time of ejection was about 7 ng. Solid images at 720×720 dpi were recorded at 720×360 dpi per one driving on OKT+ (manufactured by Oji Paper Co., Ltd.) and LPCCT (manufactured by SEIKO EPSON CORPORATION) that have a weight of about 128 g/m². The recording was conducted bidirectionally and unidirectionally at normal temperature and at normal humidity. The amount of ink that adhered was about 3.6 mg/inch square meter.

The resultant images were evaluated in accordance with the following criteria.

A: Agglomeration irregularities and white streaks caused by filling failure are observed in bidirectional printing as well as in unidirectional printing.

B: No agglomeration irregularities are observed, however, white streaks caused by filling failure are observed in bidirectional printing.

C: Agglomeration irregularities are observed in bidirectional printing. No agglomeration irregularities are observed in unidirectional printing, however, white streaks caused by filling failure are generated.

D: Agglomeration irregularities and white streaks caused by filling failure are observed in unidirectional printing.

The results are shown in the following Table 2.

Evaluation of Ink Agglomeration Irregularities and Filling Property for Cast Coated Paper The Y, M, C, K inks obtained above were combined into ink sets and installed in the ink cartridge of an ink jet printer (PX-G920 manufactured by SEIKO EPSON CORPORATION) so that recording can be conducted at 720 dpi in the main scanning (head driving) direction and at 360 dpi in the subscanning (recording media transporting) direction. Next, the voltage of the printer was adjusted such that the size of a dot adhering to a recording medium at the time of ejection was about 7 ng. Solid images at 720×720 dpi were recorded at 720×360 dpi per one driving on Mirror coat platinum (manufactured by Oji Paper Co., Ltd.) that has a weight of about 128 g/m$^2$.

The recording was conducted bidirectionally and unidirectionally at normal temperature and at normal humidity. The amount of ink that adhered was about 3.6 mg/inch square meter. The resultant images were evaluated in accordance with the following criteria.

A: Agglomeration irregularities and white streaks caused by filling failure are observed in bidirectional printing as well as in unidirectional printing.

B: No agglomeration irregularities are observed, however, white streaks caused by filling failure are observed in bidirectional printing.

C: Agglomeration irregularities are observed in bidirectional printing. No agglomeration irregularities are observed in unidirectional printing, however, white streaks caused by filling failure are generated.

D: Agglomeration irregularities and white streaks caused by filling failure are observed in unidirectional printing.

The results are shown in the following Table 2.

Evaluation of Blurring of Small Fonts

The Y, M, C, and K inks obtained above were combined into ink sets and installed in the ink cartridge of an ink jet printer (PX-G920 manufactured by SEIKO EPSON CORPORATION) so that recording can be conducted at 720 dpi in the main scanning (head driving) direction and at 360 dpi in the subscanning (recording media transporting) direction. Next, the voltage of the printer was adjusted such that the size of a dot adhering to a recording medium at the time of ejection was about 7 ng. Solid images at 720×720 dpi were recorded at 720×360 dpi per one driving. In this case, the amount of ink that adhered was about 3.6 mg/inch square meter. Under these conditions, two kanji characters that have a large number of strokes and mean rose in combination (hereinafter, referred to as "rose") were printed in Font 8 and in Font 12 in unidirectional printing on OKT+ (manufactured by Oji Paper Co., Ltd.) having a weight of about 128 g/m$^2$.

The resultant characters were evaluated in accordance with the following criteria.

A: Kanji characters "rose" in Font 8 can be recognized easily.

B: Kanji characters "rose" in Font 12 can be recognized easily, however, kanji characters "rose" in Font 8 cannot be recognized easily.

C: Kanji characters "rose" in Font 12 cannot be recognized easily.

The results are shown in the following Table 2.

Printing was conducted by the same recording method described above except that polyethylene terephthalate films (Lumirror manufactured by Toray Industries, Inc.) were used as recording media instead of OKT+ and LPCCT. The resultant printed products were dried at 40° C. at 15% RH for 3 minutes. After that, XeroxP (manufactured by Xerox Corporation) was put on the printed surfaces of the printed products under a load of 500 g/cm$^2$ and left for 3 minutes. After that, drying property was evaluated with an SPM50 manufactured by Gretag Corporation by measuring the OD values of surfaces the XeroxP, the surfaces having been subjected to ink transportation from the printed products. Evaluation criteria are as follows.

A: The OD value is less than 0.2.

B: The OD value is 0.2 or more.

The results are shown in the following Table 2.

Evaluation of Clogging Recovery Property

The ink cartridge and the ink jet printer described above were used. The button for exchanging inks was pressed and then the cord was removed from the receptacle. In this state where the head cap was detached, the printer was left at 40° C. at 15% RH for 2 days.

After the printer was left, cleaning operations were repeated until all the nozzles perform ejection as in the initial usage. Thus, recoverability was evaluated in accordance with the following evaluation criteria.

A: Recovery from clogging is achieved through 3 cleaning operations.

B: Recovery from clogging is achieved through 6 cleaning operations.

C: Recovery from clogging is achieved through 12 cleaning operations.

D: Recovery from clogging is not achieved after 12 cleaning operations.

The results are shown in the following Table 2.

TABLE 2

|  | Ink viscosity | | Ink agglomeration irregularities and filling property | | | | |
|---|---|---|---|---|---|---|---|
|  | Initial viscosity | Lapse viscosity | Media other than cast coated paper | Cast coated paper | Blurring of small fonts | Drying property | Clogging property |
| Example 1 | B | C | C | D | B | A | C |
| Example 2 | D | D | B | C | B | A | C |
| Example 3 | C | D | C | B | B | A | C |
| Example 4 | D | D | B | C | B | A | C |
| Example 5 | B | C | C | D | B | B | C |
| Example 6 | D | D | B | C | B | B | C |
| Example 7 | D | D | C | D | B | B | C |
| Example 8 | D | D | A | B | B | B | C |
| Example 9 | D | C | C | D | B | B | B |
| Example 10 | D | D | A | B | B | B | B |
| Example 11 | D | D | B | C | B | B | B |

TABLE 2-continued

| | Ink viscosity | | Ink agglomeration irregularities and filling property | | Blurring of small fonts | Drying property | Clogging property |
|---|---|---|---|---|---|---|---|
| | Initial viscosity | Lapse viscosity | Media other than cast coated paper | Cast coated paper | | | |
| Example 12 | D | D | A | B | B | B | B |
| Example 13 | S | B | C | D | B | A | C |
| Example 14 | A | C | B | C | B | A | C |
| Example 15 | AA | B | C | D | B | A | C |
| Example 16 | B | C | B | C | B | A | C |
| Example 17 | AA | B | C | D | B | B | B |
| Example 18 | B | C | B | C | B | B | B |
| Example 19 | A | B | C | D | B | B | B |
| Example 20 | C | C | A | B | B | B | B |
| Example 21 | A | B | C | D | B | B | A |
| Example 22 | C | C | A | B | B | B | A |
| Example 23 | B | B | B | C | B | B | A |
| Example 24 | D | C | A | B | B | B | A |
| Example 25 | S | A | C | D | B | A | C |
| Example 26 | A | A | B | C | B | A | C |
| Example 27 | AA | A | C | D | B | A | C |
| Example 28 | B | B | B | C | B | A | C |
| Example 29 | AA | A | C | D | B | B | A |
| Example 30 | B | A | B | C | B | B | A |
| Example 31 | A | A | C | D | B | B | A |
| Example 32 | C | B | A | B | B | B | A |
| Example 33 | A | A | C | D | B | B | A |
| Example 34 | C | A | A | B | B | B | A |
| Example 35 | B | A | B | C | B | B | A |
| Example 36 | D | B | A | B | B | B | A |
| Example 37 | S | A | C | D | B | A | B |
| Example 38 | A | A | B | C | B | A | B |
| Example 39 | AA | A | C | D | B | A | B |
| Example 40 | B | A | B | C | B | A | B |
| Example 41 | AA | A | C | D | B | B | A |
| Example 42 | B | A | B | C | B | B | A |
| Example 43 | A | A | C | D | B | B | A |
| Example 44 | C | A | A | B | B | B | A |
| Example 45 | A | A | C | D | B | B | A |
| Example 46 | C | A | A | B | B | B | A |
| Example 47 | B | A | B | C | B | B | A |
| Example 48 | D | A | A | B | B | B | A |
| Comparative Example 1 | B | C | D | D | C | A | D |
| Comparative Example 2 | D | D | D | D | C | A | D |
| Comparative Example 3 | B | D | D | D | C | A | C |
| Comparative Example 4 | D | D | D | D | C | B | B |
| Comparative Example 5 | B | C | D | D | C | A | C |
| Comparative Example 6 | D | C | D | D | C | B | B |

Examples 49 to 96 and Comparative Examples 7 to 12 were also evaluated in the above-described manner. Enhancement by one scale was observed in the evaluation of ink agglomeration irregularities and filling property for cast coated paper. However, degradation by two scales was observed in the evaluation of blurring of small fonts. The evaluation results were the same as those of Examples 1 to 48 and Comparative Examples 1 to 6 (not shown in Table 2).

Examples 97 to 144 and Comparative Examples 13 to 18 were also evaluated in the above-described manner. Enhancement by one scale was observed in the evaluation of ink agglomeration irregularities and filling property for cast coated paper. However, degradation by one scale was observed in the evaluation of blurring of small fonts. The evaluation results were the same as those of Examples 1 to 48 and Comparative Examples 1 to 6 (not shown in Table 2).

Examples 145 to 192 and Comparative Examples 19 to 24 were also evaluated in the above-described manner. Enhancement by one scale was observed in the evaluation of ink agglomeration irregularities and filling property for cast coated paper. However, degradation by one scale was observed in the evaluation of blurring of small fonts. The evaluation results were the same as those of Examples 1 to 48 and Comparative Examples 1 to 6 (not shown in Table 2).

Examples 193 to 240 and Comparative Examples 25 to 30 were also evaluated in the above-described manner. Enhancement by one scale was observed in the evaluation of ink agglomeration irregularities and filling property for cast coated paper. However, degradation by one scale was observed in the evaluation of blurring of small fonts. The evaluation results were the same as those of Examples 1 to 48 and Comparative Examples 1 to 6.

What is claimed is:

1. An ink composition for ink jet recording at least comprising a colorant, water, an alcohol solvent, and a polyorganosiloxane-based surfactant,
wherein the alcohol solvent contains a slightly water-soluble alkanediol, a water-soluble 1,2-alkanediol, and a dialkylene glycol, and wherein a sum of a content of the slightly water-soluble alkanediol and a content of the dialkylene glycol is 21 wt % or less based on the ink composition.

2. The ink composition for ink jet recording according to claim 1, wherein the slightly water-soluble alkanediol is an alkanediol having seven or more carbon atoms.

3. The ink composition for ink jet recording according to claim 1, wherein the water-soluble 1,2-alkanediol is an alkanediol having six or less carbon atoms.

4. The ink composition for ink jet recording according to claim 1, wherein a content ratio of the slightly water-soluble alkanediol to the water-soluble 1,2-alkanediol is 6:1 to 1:3.

5. The ink composition for ink jet recording according to claim 1, wherein a content ratio of the slightly water-soluble alkanediol to the dialkylene glycol is 1:1 to 1:18.

6. The ink composition for ink jet recording according to claim 1, wherein a sum of a content of the slightly water-soluble alkanediol and a content of the water-soluble 1,2-alkanediol is 6 wt % or less based on of the ink composition.

7. The ink composition for ink jet recording according to claim 1, wherein a content of the slightly water-soluble alkanediol is 1 to 3 wt % based on the ink composition.

8. The ink composition for ink jet recording according to claim 1, wherein a content of the water-soluble 1,2-alkanediol is 0.5 to 3.0 wt % based on the ink composition.

9. The ink composition for ink jet recording according to claim 1, wherein a content of the dialkylene glycol is 3 to 18 wt % based on the ink composition.

10. The ink composition for ink jet recording according to claim 1, wherein the slightly water-soluble alkanediol is 1,2-octanediol.

11. The ink composition for ink jet recording according to claim 1, wherein the water-soluble 1,2-alkanediol is one or more selected from the group consisting of 1,2-hexanediol, 4-methyl-1,2-pentanediol, and 3,3-dimethyl-1,2-butanediol.

12. The ink composition for ink jet recording according to claim 1, wherein the dialkylene glycol is dipropylene glycol.

13. The ink composition for ink jet recording according to claim 1, wherein a content of the surfactant is 0.01 to 1.0 wt % based on the ink composition.

14. The ink composition for ink jet recording according to claim 1, wherein the polyorganosiloxane-based surfactant contains one or more compounds represented by the following formula:

[Formula 1]

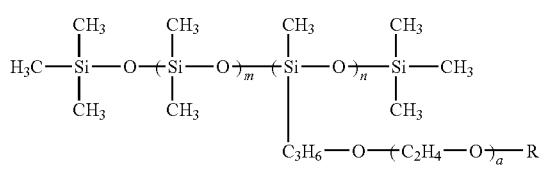

wherein R represents a hydrogen atom or a methyl group, a represents an integer of 2 to 11, m represents an integer of 2 to 50, and n represents an integer of 1 to 5.

15. The ink composition for ink jet recording according to claim 1, wherein the polyorganosiloxane-based surfactant contains one or more compounds represented by the following formula:

[Formula 2]

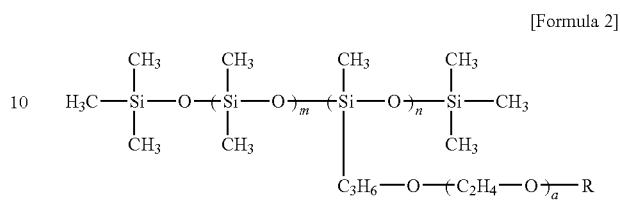

wherein R represents a hydrogen atom or a methyl group, a represents an integer of 2 to 13, m represents an integer of 2 to 50, and n represents an integer of 1 to 5.

16. The ink composition for ink jet recording according to claim 1, wherein the polyorganosiloxane-based surfactant contains one or more compounds represented by the following formula:

[Formula 3]

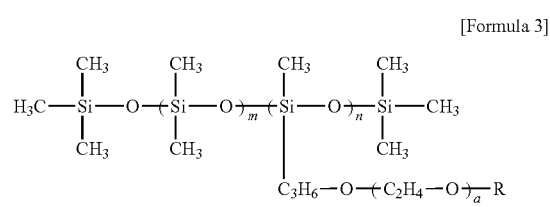

wherein R represents a hydrogen atom or a methyl group, a represents an integer of 2 to 13, m represents an integer of 2 to 50, and n represents an integer of 1 to 8.

17. The ink composition for ink jet recording according to claim 1, wherein the polyorganosiloxane-based surfactant contains one or more compounds represented by the following formula:

[Formula 4]

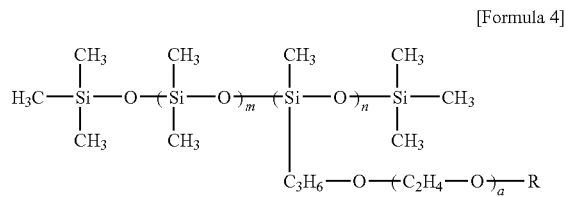

wherein R represents a methyl group, a represents an integer of 6 to 18, m represents 0, and n represents 1.

18. The ink composition for ink jet recording according to claim 1, wherein the colorant contains a pigment and a dispersing agent for permitting dispersion of the pigment in ink.

19. The ink composition for ink jet recording according to claim 18, wherein the dispersing agent contains at least one resin selected from the group consisting of styrene-acrylic-acid-based copolymer resins, urethane-based resins, and fluorene-based resins.

20. The ink composition for ink jet recording according to claim 19, wherein a content of the dispersing agent is 1.0 to 6.0 wt % based on the ink composition.

21. An ink jet recording method comprising providing the ink composition according to claim 1 and ejecting droplets of the ink composition so that the droplets adhere to a recording medium to conduct printing.

22. The method according to claim 21, wherein the recording medium is selected from the group consisting of synthetic paper mainly composed of a synthetic resin, coated printing paper, and resin films.

23. The method according to claim 22, wherein the recording medium is a resin film.

24. A recorded product recorded by the ink jet recording method according to claim 21.

* * * * *